Aug. 19, 1947.                C. L. WALLACE                2,426,073
                                PISTON DEVICE
                              Filed Oct. 16, 1943
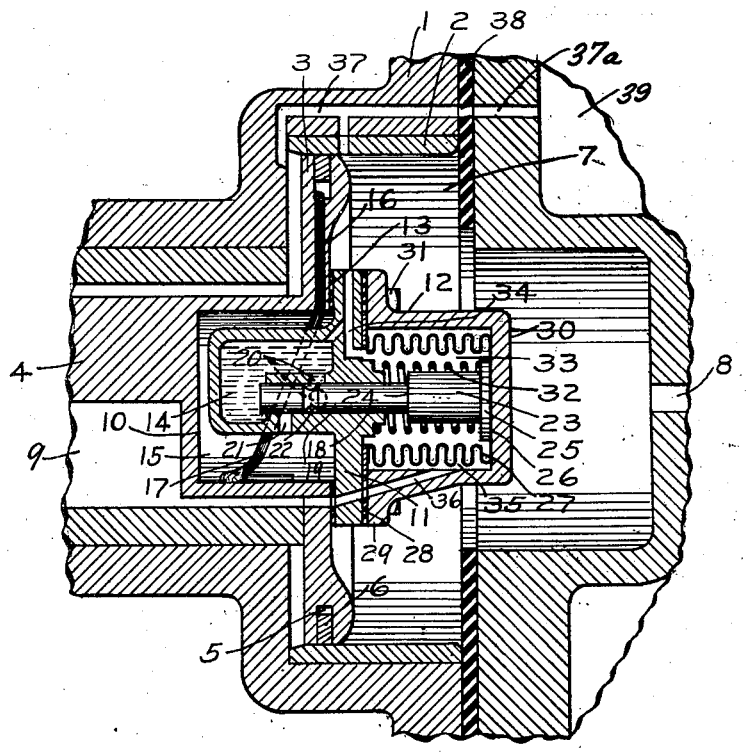
INVENTOR
CHARLES L. WALLACE
BY
ATTORNEY Patented Aug. 19, 1947

2,426,073

UNITED STATES PATENT OFFICE 2,426,073

PISTON DEVICE

Charles L. Wallace, Wilkinsburg, Pa., assignor to The Westinghouse Air Brake Company, Wilmerding, Pa., a corporation of Pennsylvania Application October 16, 1943, Serial No. 506,510

3 Claims. (Cl. 184—18)

This invention relates to automatically controlled lubricating means for supplying lubricant periodically to a plurality of cooperating friction surfaces and more particularly to a type of lubricating means suitable for use in fluid pressure control devices, such as brake controlling devices, having a piston slidably mounted therein.

In these controlling devices for fluid pressure brakes it is especially desirable to maintain a consistent minimum of friction between the piston and packing ring and between the packing ring and the bushing in which they are reciprocable in response to variations in fluid pressure. Limited and periodic lubrication has been found to be one of the best methods for maintaining this minimum of friction over an extended period of time. It is preferred that the amount of lubricant delivered to the friction surfaces be proportional to the amount of operating service in which the device is engaged.

It is an object of my invention to provide means in the piston of the device for limiting the delivery of lubricant to the friction surfaces to an amount commensurate with the reciprocatory activity of the piston.

Another object of my invention is to restrict the flow of lubricant to the friction surfaces to prevent the accumulation on these surfaces of an excess of lubricant which might in a subsequent period of inactivity become dirty and gummy resulting in an increase in friction.

Since the piston activity is governed by the variations and consequent differentials between fluid pressures on opposite sides of the piston head, these variations and differentials are, in accordance with the invention, also utilized to acuate gauging or measuring means which measure the amount of lubricant permitted to flow subsequently to the friction surfaces. The gauging means comprises a grooved plunger coupled to a diaphragm which is responsive to the same fluid pressures as the piston head, so that, a substantial differential in fluid pressure such as will move the piston will also actuate the gauging means to dispense a measured quantity of lubricant. The lubricant is discharged from a passage in the bottom of a storage reservoir into a collecting reservoir from whence it is distributed to the periphery of the piston through the medium of a wick.

In the drawing:

The figure is a cross-sectional view of the lubricating apparatus mounted on the actuating piston of a fluid pressure brake controlling valve device.

The invention is shown applied to a fluid pressure brake controlling valve device of the type having a piston responsive to variations in the pressures of fluid acting on opposite sides thereof for actuating brake controlling slide valves, not shown, but it will be understood that it is capable of more general use in any apparatus where pressures on opposite sides of a movable abutment may be varied.

As shown, the brake controlling valve device is of the type commonly employed in the emergency portion of the now standard "AB" brake equipment disclosed in Patent No. 2,031,213, issued to Clyde C. Farmer on February 18, 1936, and comprises a casing 1 having mounted therein a bushing 2 in which there is slidably mounted for reciprocable action a piston 3 having a stem 4 for actuating the usual slide valves, not shown.

The piston 3 is provided with the usual ring groove 5 for the reception of a packing ring 6 which is in sliding contact with the bushing 2 and with the side walls of the ring groove.

At the front or right hand side of the piston 3 is a chamber 7 which is open through a passage 8 to the brake pipe, not shown, or any other control pipe in which the pressure of fluid carried may be varied. At the other or stem side of the piston is a chamber 9 in which the slide valves may be actuated by the stem to vent fluid under pressure therefrom and thus effect a reduction in the pressure of fluid in the chamber.

Formed centrally of the piston 3 and piston stem 4 is a recess 10 which is open at the face or right hand side of the piston. The open end of this recess is closed by a cover plate 11 of the body portion of a gauging or measuring assemblage 12, which cover plate is rigidly clamped to the right hand face of the piston by bolts or any other suitable means, there being a sealing gasket 13 interposed between the face of the piston and the plate.

The cover plate 11 has formed integrally therewith a lubricant storage reservoir 14 which projects into the recess 10 and normally carries a quantity of lubricant as shown. The outer surfaces of this reservoir, the inner face of the cover plate and the inner surfaces of the recess 10 define a chamber 15.

Leading from chamber 15 to the bottom of the ring groove 5 is an upwardly extending bore or passage 16 which is provided in the piston for the reception of a portion of a lubricant conducting element 17 which as shown may be in the form of a fabric wick. This wick is of sufficient length that the lower end will rest on the bottom of the chamber and the upper end will project a short distance into the ring groove 5. The purpose of this wick is to transfer by capillary attraction lubricant, supplied to chamber 15 in a manner hereinafter described, to the ring groove 5.

The cover plate 11 and a thickened portion of the bottom of the oil storage reservoir 14 is provided with a bore 18 which extends in a direction longitudinal of the piston, and slidably fitted in this bore for reciprocatory movement between two positions is a cylindrical plunger 19.

The bore 18 communicates with the lubricant storage reservoir 14 by way of a plurality of ports 20 and also communicates with the chamber 15 by way of a port 21 located at a point a short distance to the left of the ports 20 and directly under which is positioned the lower end of the wick 17.

The left hand end portion of the plunger 19 is provided with a groove 22. The sides of this groove and the inner surface of the bore 18 define a chamber which, when the plunger is in its extreme right hand position as shown, is in open communication with the ports 20, and since the storage reservoir 14 contains a supply of lubricant, the chamber will of course be charged with lubricant. With the plunger in this position, the portion thereof to the left of the groove 22 laps the port 21 and thereby prevents the flow of lubricant from the reservoir 14 and the groove to the chamber 15.

The right hand end of the plunger 19 projects outwardly from the outer face of the cover plate 11 and is provided with an enlarged cylindrical right hand end portion 23 which provides a stop shoulder 24 on the plunger for engagement with the front face of the cover plate to limit movement of the plunger in the direction toward the left hand as will hereinafter appear.

The outer end of the enlarged portion 23 of the plunger is provided with an integral follower 25 which is in operative engagement with the end wall 26 of a bellows diaphragm 27. The inner end of this diaphragm is secured in air tight relationship to an outwardly extending radial flange 28 which is clamped tightly between the front face of the cover plate 11 and the flange 29 of a cap 30 by means of bolts 31 which pass through the flange and cover plate. These bolts have screw-threaded connection with the piston and thus also serve to clamp the cover plate 11 to the face of the piston.

Interposed between and operatively engaging the front face of the cover plate 11 and the back of the follower 25 and encircling the plunger 19 is a coil spring 32 which acts to urge the plunger toward the position in which it is shown.

It will be seen that the inner surfaces of the diaphragm 27 and the face of the cover plate 11 define a chamber 33 which together with reservoir 14, is open to a passage 34 leading through a portion of the cover plate to the chamber 7. It will also be seen that the outer surfaces of the diaphragm and the inner surfaces of the cap 30 define a chamber 35 which is connected to a passage 36 leading through the cap, cover plate 11 and piston 3 to chamber 9.

Operation

Assuming now that the mechanism shown in the drawing is the emergency portion of the usual "AB" brake equipment, the lubricating apparatus functions in the following manner.

In charging a fluid pressure brake equipment, fluid under pressure is supplied to the usual brake pipe from whence it flows through passage 8 to the chamber 7 and from this chamber flows through a passage means 37 to chamber 9 and also by way of a passage 37a to a quick action chamber 39.

To effect an emergency application of the brakes an emergency reduction in brake pipe pressure is effected in the usual manner and, since chamber 7 is connected to the brake pipe through passage 8, a reduction in the pressure of fluid in chamber 7 corresponding to the brake pipe reduction results. The reduction in the pressure of fluid in chamber 7 will be at a faster rate than fluid under pressure can possibly flow back from the chamber 9 to the chamber 7 by way of passage means 37 and as a consequence the higher pressure in chamber 9 will cause the piston to move toward the right into sealing engagement with a gasket 38 clamped between two portions of the casing of the device.

The piston, as it thus moves, acts through the medium of the piston stem 4 to shift the usual emergency slide valves to their emergency position in which fluid under pressure is vented from the chamber 9 to the atmosphere at a restricted rate. This venting reduces the pressure in chamber to atmospheric pressure, as is well known.

Since the chamber 35 is in open communication through passage 36 with the chamber 9, the pressure of fluid in chamber 35 will reduce with that of chamber 9.

It will here be understood that since the chamber 33 is in open communication with the chamber 7 by way of passage 34, the pressure of fluid in chamber 33 will reduce with the pressure of fluid in chamber 7. It will be understood that the pressure of fluid in chamber 33 will reduce at a faster rate than the pressure of fluid in chamber 35, and as a consequence the fluid at the higher pressure in chamber 35 will cause the bellows diaphragm 27 to flex in the direction toward the left hand and move the plunger 19 in the same direction from the position in which it is shown to its extreme left hand position where it is arrested by the engagement of the stop shoulder 24 with the face of the cover plate 11. With the plunger in this position, the groove 22 will be out of communication with the port 20 and in communication with the port 21, so that the lubricant with which the groove is charged now flows through the latter port into the chamber 15 and preferably directly upon the lower end portion of the wick 17. The wick now serves to transfer the lubricant to the ring groove 5.

The piston packing ring 6 fits slidably in the ring groove 5 and the lubricant deposited in the ring groove will flow due to capillary attraction along the walls of the groove and the outer surfaces of the packing ring 6 and piston head 3. When the piston moves the lubricant will be distributed over the inner surface of the bushing 2.

When the pressure of fluid in valve chamber 9, and consequently in chamber 35, has been reduced to a low degree, the spring 32 acts to move the plunger 19 forwardly to the position in which it is shown, so that lubricant will now flow through the port 20 from the storage reservoir to the groove 22 in the plunger. Movement of the plunger in this direction is limited by the engagement of the end wall of the bellows diaphragm with the end wall of the cap 30.

To release the brakes, fluid under pressure is again supplied to the brake pipe and thereby to the chamber 7. The pressure of fluid in chamber 7 causes the piston 3 to move to the position in which it is shown. In this position fluid under pressure flows from chamber 7 through the passage means 37 to the quick action chamber 39 by way of passage 37a and also to the chamber 9 and thereby to the chamber 35 by way of the passage 36. Fluid under pressure also flows from chamber 7 through passage 34 to chamber 33. With the equipment fully charged, the several parts of the brake controlling device and lubricating apparatus associated therewith will be in their normal brake released position as shown.

It should be mentioned that, in response to a service reduction in brake pipe, the piston 3 moves outwardly and closes communication between the chamber 7 and the charging port 37 and at this time one of the slide valves, which is shifted by the piston, establishes a communication through which fluid under pressure is vented from the chamber 9 to the atmosphere to effect a reduction in the pressure of fluid in chamber 9 at substantially the same rate as that at which the pressure of fluid in chamber 7 is reducing. As a consequence, the piston and several parts associated therewith, will come to a stop in this position as is well known.

It will be understood here that, in effecting a service reduction in the pressure of fluid in chamber 7, the fluid pressure differential produced over the bellows diaphragm 27 will not be sufficient to overcome the pressure of the spring 32, so that the plunger will remain in the position in which it is shown.

From the foregoing description it will be seen that lubricant will be delivered to the wick 17 only when an emergency application of the brakes is initiated. Since emergency applications of the brakes are made at far less frequent intervals than service applications, an excessive supply of lubricant to the parts to be lubricated is prevented.

While the lubricating apparatus has been particularly described in combination with the piston of the emergency portion of the "AB" brake equipment, it will be understood that it may be employed without change in the service portion of the equipment, since it is well known that the piston thereof is subject on one side to fluid at brake pipe pressure and on the other side to fluid at the pressure of a reservoir charged with fluid from the brake pipe in a manner similar to that of the emergency portion. It will also be understood that the apparatus may be employed in other than fluid pressure brake equipment where the proper pressure differentials over the bellows diaphragm are obtainable.

Having now described my invention, what I claim as new and desire to secure by Letters Patent, is:

1. In a lubricating apparatus for a pneumatically operated piston device, a piston reciprocable in a bore in said device in response to variations in the pressure of fluid on at least one side of the piston, a chamber carried by said piston, a passage extending from said chamber to the periphery of said piston, a lubricant conducting element extending from the bottom of said chamber and through said passage, a reservoir extending into said chamber and adapted to contain lubricant, and lubricant gauging means located between said reservoir and said chamber for conveying lubricant from said reservoir to said chamber, said means comprising a plunger carried in a bore in the casing of said reservoir and having provided therein a lubricant carrying groove which connects with said reservoir in one position and with said chamber in another position, and a movable abutment subject to the fluid pressure acting upon said piston and responsive to a reduction in the fluid pressure at one side of said piston to actuate said plunger from said one position to said other position.

2. In a lubricating apparatus for a device having a piston reciprocable in a bore in response to variations in the pressure of fluid on opposite sides of the piston, a reservoir carried by said piston and adapted to contain lubricant, a lubricant receiving chamber, means for conveying lubricant from said chamber to the periphery of said piston, and lubricant gauging means located between said reservoir and said chamber for conveying lubricant from said reservoir to said chamber, said means comprising a plunger carried in a bore in the casing of said reservoir and having provided therein a lubricant carrying groove which connects wtih said reservoir in one position and with said chamber in another position, a movable abutment subject to the fluid pressure acting upon said piston and responsive to a certain reduction in the pressure of fluid at one side of said piston to actuate said plunger from said one position to said other position, and pressure means biasing said abutment toward said one position.

3. In a lubricating apparatus for the peripheral portion of the piston of a fluid pressure operated controlling valve device, said piston being normally subject on opposite sides to equalized fluid pressures and being responsive to a reduction in the pressure of fluid on one side at a certain rate to assume one control position and being responsive to a reduction in said pressure at a rate faster than said certain rate to assume another control position, a chamber carried by said piston, means for conducting lubricant from the bottom of said chamber to the peripheral portion of said piston, a reservoir extending into said chamber and adapted to contain lubricant, means operative to supply a measured amount of lubricant to the first mentioned means, the latter mentioned means comprising a casing for said reservoir, a plunger carried in a bore in said casing and having provided therein a lubricant carrying groove which connects with said reservoir in one position and with said chamber in another position, and a movable abutment subject opposingly to said equalized pressures and responsive only to the faster rate of reduction in the pressure of fluid on said one side of the piston for operating the second mentioned means.

CHARLES L. WALLACE.

REFERENCES CITED

The following references are of record in the file of this patent:

UNITED STATES PATENTS

| Number | Name | Date |
| --- | --- | --- |
| 504,178 | Snyder | Aug. 29, 1893 |
| 597,860 | Rolfe | Jan. 25, 1898 |
| 764,886 | Donnenwerth | July 12, 1904 |
| 1,287,701 | Kosenko | Dec. 17, 1918 |
| 1,405,375 | Allen | Jan. 31, 1922 |
| 2,151,008 | Campbell | Mar. 21, 1939 |
| 2,163,399 | Hewitt | June 20, 1939 |
| 829,866 | Gratiot | Aug. 28, 1906 |
| 1,650,091 | Nelson | Nov. 22, 1927 |